UNITED STATES PATENT OFFICE.

EDOUARD GRIMAUX, OF PARIS, FRANCE, ASSIGNOR TO JEAN BAPTISTE FRANÇOIS RIGAUD.

PROCESS OF MAKING SALTS OF QUININE.

SPECIFICATION forming part of Letters Patent No. 501,066, dated July 11, 1893.

Application filed July 27, 1892. Serial No. 441,389. (Specimens.) Patented in England July 12, 1892, No. 12,811.

*To all whom it may concern:*

Be it known that I, EDOUARD GRIMAUX, a citizen of the Republic of France, residing at Paris, France, have invented certain new and useful Improvements in the Preparation of Double Salts of Quinine, of which the following is a specification.

This invention is the subject of Letters Patent in Great Britain, No. 12,811, dated July 12, 1892.

This invention consists in preparing double salts of quinin by adding to and incorporating with basic sulfate of quinin hydrochloric and hydrobromic acids respectively. Salts are thereby obtained possessing great solubility which is very advantageous. These salts are used as medicines, and have the same relation to quinin as their corresponding sulfate and bromhydrate of quinin. The chlorhydro-sulfate of quinin is soluble in its weight of water, whereas the sulfate of quinin requires seven hundred and fifty-five times its weight of water. The bromhydro-sulfate of quinin is soluble in a little more than three times its weight of water, whereas the bromhydrate requires to dissolve it seven times its weight of water. These salts are prescribed in the same doses as the other salts of quinin. The chlorhydro-sulfate of quinin, because of its great solubility, presents great advantages for hypodermic injections, for which use the dose will be determined by the physician.

In carrying out the invention, I make halogen compounds of quinin sulfate, as chlorhydro-sulfate or bromhydro-sulfate of quinin, by causing an acid halogen reagent, composed of hydrogen and a haloid in chemical union, as hydrochloric acid or hydrobromic acid, either in liquid or gaseous form, to react upon sulfate of quinin, or upon a salt of quinin, or upon quinin in the presence of sulfuric acid, and then remove the excess of the reagent and dry the product.

The process or method is as follows: In order to prepare chlorhydro-sulfate of quinin take basic sulfate of quinin, thirty kilograms; hydrochloric acid of a density of 1.050, twenty-four liters. Solution takes place instantaneously. The solution is left to evaporate in dry *vacuo*; the salt takes the form of agglomerated needles. The analysis of the body dried in dry air leads to the formula:

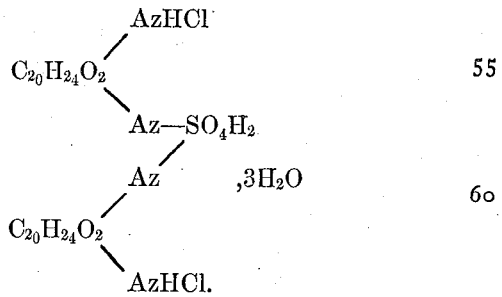

The chlorhydro-sulfate of quinin loses its water of crystallization at 100° centigrade; it is very soluble; the anhydrous salt becomes dissolved cold in its weight of water. It can also be obtained by directing a current of hydrochloric acid gas upon sulfate of quinin dried at 100°; the combination takes place with notable disengagement of heat. The product of the reaction is first traversed by a current of air, then deprived of excess of hydrochloric acid by being placed *in vacuo* in presence of potash.

Instead of treating the sulfate of quinin, quinin can be treated with hydrochloric acid or hydrobromic acid in the presence of sulfuric acid.

These salts are remarkable for their great solubility as compared with that of the other sulfates and of the basic hydrochlorate. They constitute definite chemical species; the analysis of the crystals which become deposited successively from the solution by evaporation *in vacuo* assigns to them the same composition as the total mass.

Bromhydro-sulfate of quinin is obtained in an analogous manner. For example take sulfate of quinin, thirty kilograms; hydrobromic acid of a density of 1.180, twenty-one kilograms. Dissolution takes place instantaneously and shortly afterward the solution becomes a gelatinous mass which gradually becomes formed into crystals which are dried *in vacuo*. This salt is less soluble than the preceding; after desiccation at 100° centigrade it requires about three times its weight of water to dissolve it at the ordinary temperature. Dried in dry air it contains three molecules of water of crystallization.

I claim—

1. The process of making halogen compounds of quinin sulfate, as chlorhydro-sulfate or bromhydro-sulfate of quinin, which consists in causing an acid halogen reagent, composed of hydrogen and a haloid, as hydrochloric acid or hydrobromic acid, to react upon quinin in the presence of sulfuric acid.

2. The process of making halogen compounds of quinin sulfate, as chlorhydro-sulfate or bromhydro-sulfate of quinin, which consists in causing an acid halogen reagent, composed of hydrogen and a haloid, as hydrochloric acid or hydrobromic acid, to react upon a sulfur salt of quinin, and then removing the excess of said halogen reagent.

3. The process of making halogen compounds of quinin sulfate, as chlorhydro-sulfate or bromhydro-sulfate of quinin, which consists in causing an acid halogen reagent, composed of hydrogen and a haloid, as hydrochloric acid or hydrobromic acid, to react upon a sulfur salt of quinin, and then drying the resulting product.

In witness whereof I have hereunto signed my name in the presence of two subscribing witnesses.

EDOUARD GRIMAUX.

Witnesses:
  RIGAUD,
  CH. NEARDEBA.